(12) United States Patent
Nielsen

(10) Patent No.: US 8,402,672 B2
(45) Date of Patent: Mar. 26, 2013

(54) METHOD OF CONTROLLING A SPRAY DRYER APPARATUS BY REGULATING AN INLET AIR FLOW RATE, AND A SPRAY DRYER APPARATUS

(75) Inventor: Peter Schultz Nielsen, Søborg (DK)

(73) Assignee: GEA Process Engineering A/S, Soborg (DK)

( * ) Notice: Subject to any disclaimer, the term of this patent is extended or adjusted under 35 U.S.C. 154(b) by 766 days.

(21) Appl. No.: 12/520,036

(22) PCT Filed: Dec. 22, 2006

(86) PCT No.: PCT/DK2006/050081
§ 371 (c)(1),
(2), (4) Date: Aug. 12, 2009

(87) PCT Pub. No.: WO2008/077399
PCT Pub. Date: Jul. 3, 2008

(65) Prior Publication Data
US 2010/0005683 A1 Jan. 14, 2010

(51) Int. Cl.
*F26B 3/02* (2006.01)

(52) U.S. Cl. .......... 34/379; 34/474; 34/90; 34/218; 159/4.01; 210/609; 110/224

(58) Field of Classification Search ............ 34/379, 34/380, 381, 474, 497, 524, 61, 68, 88, 90, 34/210, 218; 159/4.01; 210/609; 110/224
See application file for complete search history.

(56) References Cited

U.S. PATENT DOCUMENTS

| | | | | |
|---|---|---|---|---|
| 2,099,954 | A | * 11/1937 | Cook | 128/204.16 |
| 3,038,533 | A | 6/1962 | Comings et al. | |
| 3,228,115 | A | * 1/1966 | Swanson et al. | 34/591 |
| 3,290,788 | A | * 12/1966 | Seelandt | 34/294 |
| 3,448,530 | A | * 6/1969 | Mortensen | 34/380 |
| 3,938,259 | A | * 2/1976 | Ormos et al. | 34/361 |
| 5,019,994 | A | 5/1991 | Rainville | |
| 5,042,169 | A | * 8/1991 | Vero | 34/591 |

(Continued)

FOREIGN PATENT DOCUMENTS
EP  0 095 265 A2  11/1983
EP  0 479 204 A1  4/1992

(Continued)

OTHER PUBLICATIONS

Masters, K., Spray Drying Handbook, 5th ed., pp. 120-121 and 375-371, London, Longman Scientific & Technical (1991).

*Primary Examiner* — Stephen M. Gravini
(74) *Attorney, Agent, or Firm* — Sughrue Mion, PLLC

(57) ABSTRACT

A method of controlling a spray dryer apparatus having a spray dryer chamber (1), an air inlet (2), an inlet air control system (11) including a fan (13) and an air heater (14), a feed inlet (3), and an exhaust air outlet (4), comprising determining a content (Y) of moisture of inlet air, determining an inlet air temperature set value ($T_{inlet}$) in dependence of the inlet air moisture content (Y), determining an inlet air temperature measured value of inlet air between the air heater (14) and the spray dryer chamber (1), and regulating the inlet air temperature in dependence of the inlet air temperature set value and the inlet air temperature measured value, and determining an outlet air temperature of the exhaust air and regulating an inlet air flow rate in dependence of the outlet air temperature.

15 Claims, 2 Drawing Sheets

U.S. PATENT DOCUMENTS

Figure 1:
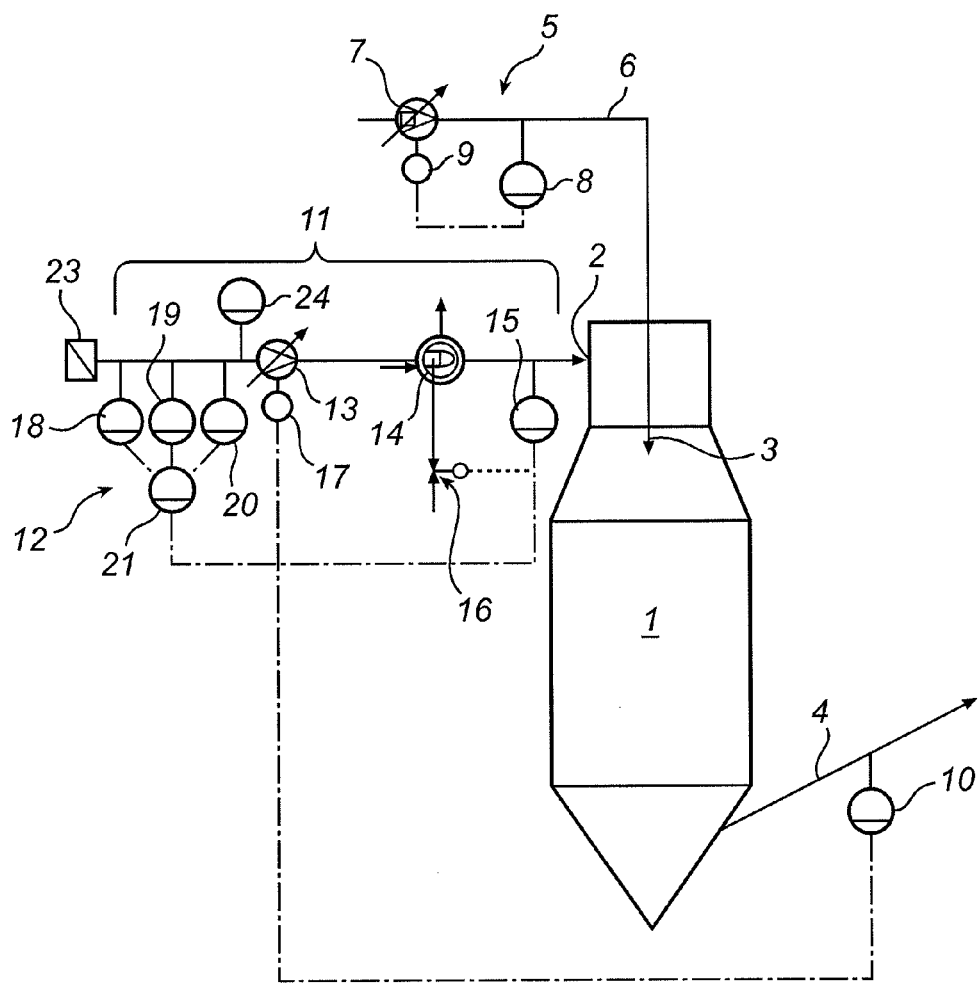

| | | | |
|---|---|---|---|
| 5,709,038 A * | 1/1998 | Scheufler et al. | 34/475 |
| 6,079,118 A * | 6/2000 | Kiyokawa | 34/134 |
| 6,256,902 B1 * | 7/2001 | Flaherty et al. | 34/379 |
| 2004/0153804 A1 * | 8/2004 | Blevins et al. | 714/33 |
| 2005/0050759 A1 * | 3/2005 | Chandran et al. | 34/576 |
| 2010/0005683 A1 * | 1/2010 | Nielsen | 34/474 |
| 2010/0011610 A1 * | 1/2010 | Bittorf et al. | 34/359 |

FOREIGN PATENT DOCUMENTS

| | | |
|---|---|---|
| EP | 0 997 696 A2 | 5/2000 |
| EP | 1 195 191 A1 | 4/2002 |
| JP | 3-106401 | 5/1991 |
| JP | 07-103655 A | 4/1995 |
| WO | 01/23821 A1 | 4/2001 |

* cited by examiner

METHOD OF CONTROLLING A SPRAY DRYER APPARATUS BY REGULATING AN INLET AIR FLOW RATE, AND A SPRAY DRYER APPARATUS

The present invention relates to a method of controlling a spray dryer apparatus having a spray dryer chamber, an air inlet, an inlet air control system including a fan and an air heater, a feed inlet, and an exhaust air outlet.

The invention further relates to a spray dryer apparatus.

Spray dryers are used for drying a feed comprising solids and a solvent e.g. water by spraying the feed in form of droplets into a spray dryer chamber. In the spray dryer chamber the spray is meet by an, often hot, inlet air flow causing the solvent to evaporate. A dried product in form of a powder with residual moisture content can thereafter be collected from the apparatus.

The quality and efficiency of the spray drying process is depending on several parameters such as: The pattern of the spray including i.a. the distribution of smaller and bigger droplets, the pattern of the air flow in the spray dryer chamber, the inlet air temperature, the feed rate, the inlet air flow rate etc.

Apart from the dried product, exhaust air containing evaporated solvent is a product of the drying process, and parameters such as the outlet air temperature of the exhaust air and the relative humidity of the exhaust air are normally used to design the drying process. The outlet temperature is measured during the process and is generally known to be closely related to the condition of the dried product.

Thus it is normal practice to control the operation of a spray dryer apparatus on basis of measurements of the outlet air temperature.

Two different methods of control are used in the art namely:

Maintaining a set outlet air temperature by adjusting the feed rate to the dryer; or Maintaining a set outlet temperature by adjusting the inlet air temperature.

The set outlet temperature may be kept constant in accordance with a value set a priori for a specific spray dryer apparatus and a specific process, or the set outlet temperature may be adjusted during operation on basis of measurements of moisture content of the dried product (cf. Masters, K., *Spray Drying Handbook*, 5th ed., Chapter 10, London, Longman Scientific & Technical (1991)). From this reference it is further known that high ambient air relative humidity may necessitate a reduction of the inlet air temperature and thus a reduction of the capacity of the spray dryer apparatus, (pages 120-121).

The above-mentioned known methods of control have some disadvantages.

Adjusting the feed rate entails that the capacity of the spray dryer apparatus is not optimally utilised, and if the spray drying is a part of a larger process adjusting/lowering the feed rate may result in delays in the entire process. Further, adjusting the feed rate may influence the spray pattern and thus the powder characteristics in an undesirable manner.

Adjusting the inlet air temperature may not be acceptable e.g. if the required adjustment is an increase of the temperature and the inlet air temperature is already close to a limit not to be exceeded in order not to risk heat damaging the product.

In case of an increase of the moisture content of the ambient air, which in a usual spray drying process is heated and used as inlet air, the drying capacity decreases as mentioned above. Under such circumstances it is normal procedure to decrease the feed rate to compensate for the decreasing capacity.

A way of dealing with a fluctuating moisture content of the ambient air is to use a dehumidification equipment on the inlet air, but this is expensive and normally relevant for small capacity equipment only.

The object of the present invention is to provide a method of control, which at least to some degree avoids these disadvantages of the prior art. It is a further object to provide an apparatus suited for using such a method. It is a further object to provide a method of control and an apparatus allowing keeping nearby constant the outlet air temperature, the relative humidity of the outlet air and therewith the residual moisture content of the dried product.

In a first aspect these objects are met according to the invention by a method of controlling a spray dryer apparatus having a spray dryer chamber, an air inlet, an inlet air control system including a fan and an air heater, a feed inlet, and an exhaust air outlet, comprising determining a content of moisture of inlet air, determining an inlet air temperature set value in dependence of the inlet air moisture content, determining an inlet air temperature measured value of inlet air between the air heater and the spray dryer chamber, and regulating the inlet air temperature in dependence of the inlet air temperature set value and the inlet air temperature measured value, and determining an outlet air temperature of the exhaust air and regulating an inlet air flow rate in dependence of the outlet air temperature. Adjusting the inlet air temperature according to changes in the inlet air moisture content makes it possible to keep as well the temperature as the relative humidity of outlet air constant, and adjusting the inlet air flow rate makes it possible to keep the feed rate constant, thus making it possible to run the spray dryer apparatus under substantially constant conditions to obtain a product with substantially constant specifications and quantity. The inlet air moisture content may e.g. be measured continuously, at intervals, preferably regular intervals, or at predetermined times.

The inlet air moisture content determined may be the moisture content of the ambient air. In such case, which will be the normal case, any moisture added to ambient air before it reaches the air inlet is taken into account when determining the inlet air temperature set value.

Preferably, determining an inlet air temperature set value in dependence of the inlet or ambient air moisture content comprises providing a priori for a specific spray dryer apparatus and for a specific product to be processed by the spray dryer apparatus an expression for the inlet air temperature set value in dependence of varying inlet or ambient air moisture content. Such expression may be presented as a table, a curve, an algorithm, etc.

The method preferably comprises displaying said expression to an operator.

Preferably the method further comprises displaying to the operator at least one current operational parameter together with at least one limit of an acceptable range for said operational parameter. The operational parameter is preferably selected from a group comprising inlet air moisture content, ambient air moisture content, ambient air relative humidity, inlet air temperature measured value, inlet air temperature set value, inlet air flow rate, a fan speed, and outlet air temperature.

Thereby it is possible to give the operator an indication of the current state of operation of the spray dryer apparatus making it possible for the operator to decide whether the control strategy used is correct under the circumstances.

In a second aspect the objects of the invention is obtained by a spray dryer apparatus comprising a spray dryer chamber, a feed inlet, a feed control device, an air inlet, an inlet air control system and an exhaust air outlet with an outlet air temperature measuring device, said inlet air control system comprising a fan, an inlet air flow rate control device, an air heater with an air heater control device, and an inlet air temperature measuring device for measuring temperature of inlet air between the air heater and the spray dryer chamber, said spray dryer apparatus further comprising an inlet air moisture content measuring device, a controller for determining an inlet air temperature set value depending on the inlet air moisture content, a connection for forwarding said inlet air temperature set value to the air heater control device and a connection for forwarding an outlet temperature measured value from the outlet air temperature measuring device to the inlet air flow rate control device. Thereby an apparatus is obtained, which is able to operate in accordance to the method of the invention and thus to operate under substantially constant conditions to produce a product of substantially constant quality and quantity.

Preferably the inlet air moisture content measuring device is an ambient air moisture content measuring device, and preferably said device comprises a hygrometer, a thermometer, a barometer, and a controller.

The air inlet flow rate control device may comprise the fan and a fan controller.

Preferably the apparatus is provided with a graphic display device for displaying to an operator at least a current value of an operational parameter such as inlet air moisture content, ambient air moisture content, ambient air relative humidity, inlet air temperature measured value, inlet air temperature set value, inlet air flow rate, a fan speed, or outlet air temperature.

Figure 2:
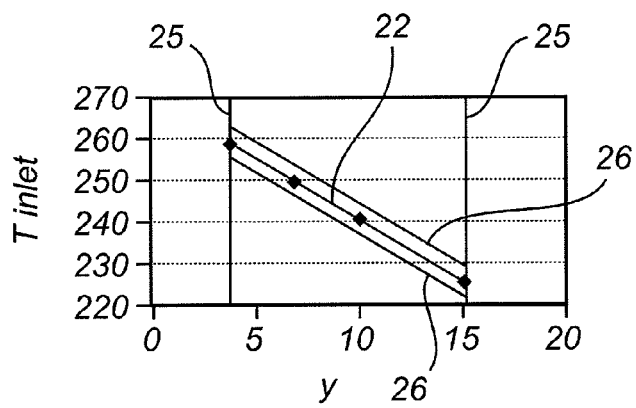
Figure 3:
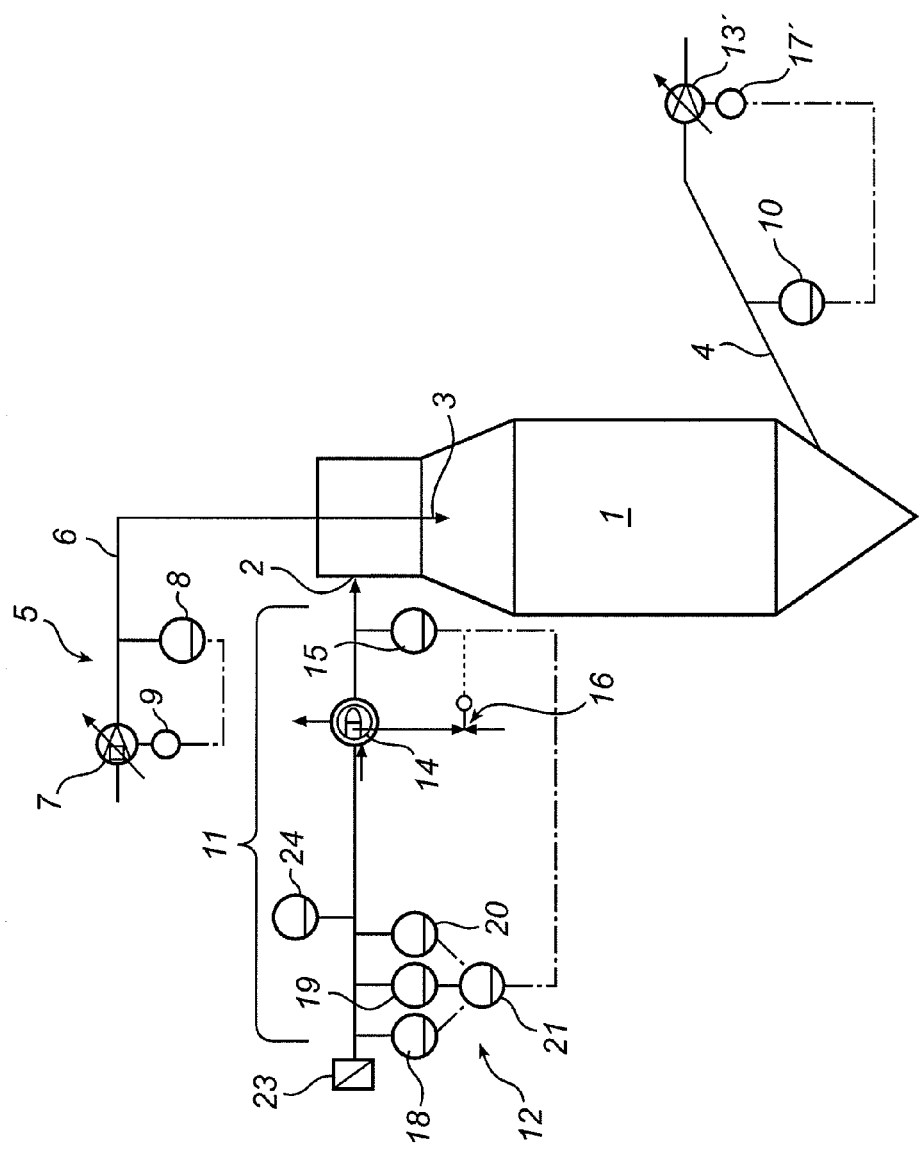

The invention will be described in further detail in the following with reference to the schematic drawing, in which FIG. 1 shows an apparatus according to the invention, FIG. 2 shows a graphic representation of a working line for the apparatus and FIG. 3 shows a variant of he apparatus shown in FIG. 1.

FIG. 1 shows a spray dryer apparatus comprising a spray dryer chamber 1 with an air inlet 2, a feed inlet 3 and an exhaust air outlet 4. Further the apparatus comprise an outlet for dried product not shown and possibly an integrated fluid bed for treatment of the dried product as it is known in the art.

The spray dryer apparatus comprises a feed control device 5 connected to the feed inlet 3 by a feed line 6 for controlling the rate of the feed. The feed control device 5 comprises a feed pump 7, a pressure gauge 8 and feed pump controller 9 for maintaining a set pressure in the feed line 6.

The feed inlet 3 may comprise any known atomizer for atomising the feed such as a nozzle or a rotary atomizer.

The exhaust air outlet is provided with an outlet air temperature measuring device 10.

The exhaust air outlet 4 may be connected to a dust collector or the like, as it is generally known in the art. Also the exhaust air outlet may be connected to an exhaust fan, which may be regulated to maintain a set pressure inside the spray dryer chamber 1, as it is also known in the art.

The spray dryer apparatus further comprises an inlet air control system or device 11, which comprises an ambient air moisture content measuring device 12, a fan 13, an air heater 14, an inlet air temperature measuring device 15, an air heater control device or controller 16 and a fan controller 17.

The air heater 14 is in the present embodiment an indirect air heater heating the inlet air via a heat exchanger. Alternatively a direct air heater may be used, as it is known in the art.

The ambient air moisture content measuring device 12 comprises in the present embodiment a hygrometer 18, a thermometer 19, a barometer 20 and a controller 21.

One or more of the controllers may be incorporated in the general control system of the spray dryer apparatus.

During operation the spray dryer apparatus is controlled as follows:

A working line is a priori established for the spray dryer apparatus and for the specific process to be run, considering i.a. the nature of the feed and the required specifications of the dried product. This working line represents the connection between the current moisture content of the ambient air Y and the inlet air temperature $T_{inlet}$ that will provide the requested dried product specifications given the fact that a change of the ambient air moisture content will entail a change of the relative humidity and/or the temperature of the exhaust air, and thus a change of the specifications of the dried product, if the inlet temperature is not adjusted correspondingly.

The working line should take into account features of the actual spray dryer apparatus such as heat loss from the spray dryer chamber, whether the air heated is an indirect heater heating the air through a heat exchanger or a direct heater combusting a fuel such as natural gas directly in the inlet air thus providing additional moisture content to the inlet air, any supplementary air introduced into the spray dryer chamber etc. The latter could e.g. be fluidizing air, conditioning air, JET SWEEP™ air, air-broom air or the like.

FIG. 2 shows an example of a curve 22 of a working line, the curve being shown in a coordinate system having Y (g water vapour per kg dry air) as abscissa and $T_{inlet}$ (° C.) as ordinate. The curve 22 is a straight line with a negative slope and represents a case of indirect heating. In case of direct heating the slope would have been steeper due to the water supplied by the combustion.

A feed rate is set and the feed pump controller 9 regulates the feed pump 7 to maintain a constant pressure in the feed line 6 that will provide the set feed rate.

The current moisture content of the ambient air is determined in that measurements of the hygrometer 18 (measuring relative humidity), the thermometer 19 and the barometer 20 are feed to the controller 21, which on basis of these measurements establishes the content Y (g water vapour per kg dry air) of moisture in the air. This may be established in any known manner e.g. by utilising a Psychrometric or Mollier chart.

The controller 21 establishes an inlet air temperature set value on basis of the working line and feeds said value to the air heater controller 16.

The fan 13 sucks air through a filter 23, past measuring points of the hygrometer 18, the thermometer 19, and the barometer 20, and blows it through the air heater, past a measuring point of the inlet air temperature measuring device 15, and through the air inlet 2 into the spray dryer chamber 1.

The measured inlet air temperature value is fed to the air heater controller 16 where it is compared with the inlet air temperature set value and the air heater controller regulates the supply of fuel to the heater on basis of the comparison to obtain a measured value of the temperature equal to the set value.

The value of the outlet air temperature as measured by the outlet temperature measuring device 10 is fed to the fan controller 17, where it is compared to an outlet air temperature set value. The fan controller 17 functions as an inlet air flow rate control device by controlling the speed of the fan 13 in response to the comparison between the set and the measured values of the outlet air temperature. In case the measured value is lower than the set value the speed of the fan 13 is increased to increase the flow rate of inlet air and thus to increase the flow of heat energy into the spray dryer chamber 1 and vice versa.

In this way the outlet temperature is maintained substantially constant and as the feed rate is also maintained constant the rate of evaporation of the solvent of the feed (water) is by this method maintained substantially constant.

The shown embodiment of the apparatus further comprises a flow meter 24 measuring the flow rate of inlet air. Optionally the fan controller 17 may have an input from the flow meter 24 for assisting the control of the apparatus.

FIG. 3 shows a variant of the apparatus shown in FIG. 1 and similar items are referred to by similar reference numerals. Only the differences between the two embodiments will be explained in the following.

Whereas the inlet air control device 11 of the embodiment shown in FIG. 1 comprises a fan 13 blowing air into the spray dryer chamber 1, in the embodiment shown in FIG. 3 an inlet air control device or system 11' comprises a suction fan 13' situated at the exhaust air outlet 4 and a suction fan controller 17'. As by the embodiment shown in FIG. 1 a dust collector, not shown, may be connected to the exhaust air outlet 4. Such a dust collector may be placed upstream or downstream of the suction fan 13'.

As by the embodiment shown in FIG. 1, the value of the outlet air temperature as measured by the outlet temperature measuring device 10 is fed to the suction fan controller 17', where it is compared to an outlet air temperature set value. The suction fan controller 17' functions as an inlet air flow rate control device by controlling the speed of the suction fan 13' in response to the comparison between the set and the measured values of the outlet air temperature. In case the measured value is lower than the set value the speed of the suction fan 13' is increased to increase the flow rate of air through the spray dryer chamber 1 and thus the flow rate of inlet air thereby increasing the flow of heat energy into the spray dryer chamber 1 and vice versa.

Below are given 4 examples of operation of a spray dryer apparatus according to the invention at different ambient air moisture contents:

EXAMPLE 1

(Standard)
Ambient air moisture content: Y=7 g water/kg dry air,
Feed rate: FER=4,110 kg/h,
Outlet air temperature: $T_{outlet}$=105° C.,
Inlet air temperature: $T_{inlet}$=250° C.,
Inlet dry air flow rate: G=37,956 kg/h,
Relative volume inlet air: Load=1

EXAMPLE 2

Ambient air moisture content: Y=4 g water/kg dry air,
Feed rate: FER=4,110 kg/h,
Outlet air temperature: $T_{outlet}$=105° C.,
Inlet air temperature: $T_{inlet}$=259° C.,
Inlet dry air flow rate: G=35,890 kg/h,
Relative volume inlet air: Load=0.951

EXAMPLE 3

Ambient air moisture content: Y=10 g water/kg dry air,
Feed rate: FER=4,110 kg/h,
Outlet air temperature: $T_{outlet}$=105° C.,
Inlet air temperature: $T_{inlet}$=241° C.,
Inlet dry air flow rate: G=40,269 kg/h,
Relative volume inlet air: Load=1.055

EXAMPLE 4

Ambient air moisture content: Y=15 g water/kg dry air,
Feed rate: FER=4,110 kg/h,
Outlet air temperature: $T_{outlet}$=105° C.,
Inlet air temperature: $T_{inlet}$=226° C.,
Inlet dry air flow rate: G=44,846 kg/h,
Relative volume inlet air: Load=1.164

These examples show how the inlet air temperature ($T_{inlet}$) is decreased and the inlet air flow rate (G), and together therewith the relative volume of inlet air (Load), is increased when the moisture content of the ambient air (Y) is increased and vice versa.

FIG. 2 shows the corresponding values of Y and $T_{inlet}$ of the above examples 1-4, lying on the working line (curve 22).

According to the invention a figure like the one shown in FIG. 2 may be shown on a graphic display of the spray dryer apparatus to indicate to an operator the state of operation of the spray dryer apparatus. Such a figure may also show limits 25 of a range for Y within which operation is acceptable and outside which operation is not acceptable or not possible. Thus it may be limited to which extent the inlet air flow rate may be adjusted e.g. the fan has a maximum capacity which cannot be exceeded. If Y is outside the acceptable range the operator may change the method of operation e.g. select a different feed rate, which will entail a different acceptable range for Y, or select another known method of regulation. If the spray drying process is an in line part of a larger process, selecting a different feed rate has the advantage that the changed flow of material through the spray dryer process is still constant, which makes it easier to regulate the larger process because variations of Y within certain limits will not cause variations of the larger process.

Further a figure shown on a graphic display to an operator may for the inlet air temperature $T_{inlet}$ show the set value or the measured value. The set value will strictly follow the curve 22 whereas the measured value will due to delays in the regulation system be situated within a band surrounding the curve 22. Thus the figure may comprise lines 26 indicating acceptable variations of the measured value of the inlet air temperature from the set value. If the acceptable variations are exceeded it is an indication or warning for the operator that appropriate action must be taken. Other or further measured parameters may be shown to the operator as possible warning, e.g. the ambient air relative humidity, the speed of the fan, etc.

For certain situations necessary actions may be taken automatically, e.g. selecting a different feed rate and working line, if Y exceeds a limit of the acceptable range. So this invention includes all automatic systems to perform the actions according to the method described.

The working line may be represented by a straight curve 22 as shown in FIG. 2, but it may from experiences turn out that the correct relationship between Y and $T_{inlet}$ that will maintain a given outlet air relative humidity for a given outlet air temperature, is nonlinear. The working line to be used in the method according to the invention should be based on such experiences with the feed in question and the actual spray dryer apparatus.

Different feeds need different working lines and thus the operator should be able to change the working line if the feed is changed, i.e. in case another product is to be dried.

Due to the constant feed rate obtained by the present invention, deposits may be kept at a minimum thus reducing the needs for maintenance. Further due to the constant process conditions a most homogeneous product may be obtained by method of the invention.

The scope of the present invention is not limited to the embodiments disclosed herein, but is defined in the claims. The skilled person will be able to suggest various modifications to the embodiment disclosed herein. Thus the air inlet system may be constructed differently from what is suggested herein and the regulation of the inlet air flow rate may be performed by other means than regulating the speed of a fan. Also e.g. the establishment of the moisture content of the ambient air may be performed in any conceivable way.

The invention claimed is:

1. A method of controlling a spray dryer apparatus having a spray dryer chamber, an air inlet, an inlet air control system including a fan and an air heater, a liquid feed inlet, and an exhaust air outlet, said method comprising:
   introducing a liquid feed into the spray dryer chamber,
   determining a content of moisture of inlet air,
   determining an inlet air temperature set value in dependence of the inlet air moisture content,
   determining an inlet air temperature measured value of inlet air between the air heater and the spray dryer chamber, and
   regulating the inlet air temperature in dependence of the inlet air temperature set value and the inlet air temperature measured value, and
   determining an outlet air temperature of the exhaust air and regulating an inlet air flow rate in dependence of the outlet air temperature.

2. A method according to claim 1, wherein the inlet air moisture content determined is the moisture content of the ambient air, and wherein any moisture added to ambient air before reaching the air inlet is taken into account when determining the inlet air temperature set value.

3. A method according to claim 1, wherein determining an inlet air temperature set value in dependence of the inlet air moisture content comprises providing a priori for a specific spray dryer apparatus and for a specific product to be processed by the spray dryer apparatus an expression for the inlet air temperature set value in dependence of varying inlet air moisture content.

4. A method according to claim 1, wherein an automatic system is used to carry out said regulations.

5. A method according to claim 3, comprising displaying said expression to an operator.

6. A method according to claim 1, comprising displaying to an operator at least one current operational parameter together with at least one limit of an acceptable range for said operational parameter.

7. A method according to claim 6, wherein said operational parameter is selected from a group comprising inlet air moisture content, ambient air moisture content, ambient air relative humidity, inlet air temperature measured value, inlet air temperature set value, inlet air flow rate, a fan speed, and outlet air temperature.

8. A method according to claim 1, wherein a feed flow through said feed inlet is kept constant unless the moisture content of the inlet air falls outside an acceptable range.

9. A spray dryer apparatus comprising;
   a spray dryer chamber,
   a liquid feed inlet,
   a feed control device,
   an air inlet,
   an inlet air control system controlling during operation air inlet by the air inlet and
   an exhaust air outlet with
   an outlet air temperature measuring device,
   said inlet air control system comprising:
      a fan,
         an inlet air flow rate control device,
         an air heater with
         an air heater control device, and
         an inlet air temperature measuring device measuring during operation temperature of inlet air between the air heater and the spray dryer chamber,
      said spray dryer apparatus further comprising:
         an inlet air moisture content measuring device,
         a controller determining during operation an inlet air temperature set value depending on the inlet air moisture content,
         a connection forwarding during operation said inlet air temperature set value to the air heater control device and
         a connection forwarding during operation an outlet temperature measured value from the outlet air temperature measuring device to the inlet air flow rate control device.

10. A spray dryer apparatus according to claim 9, wherein said inlet air moisture content measuring device is an ambient air moisture content measuring device.

11. A spray drying apparatus according to claim 9, wherein said inlet air moisture content measuring device comprises a hygrometer, a thermometer, a barometer, and a controller.

12. A spray drying apparatus according to claim 9, wherein the inlet air flow rate control device comprises said fan and a fan controller.

13. A spray dryer apparatus according to claim 12 wherein said fan is placed upstream of the spray dryer chamber.

14. A spray dryer apparatus according to claim 12 wherein said fan is a suction fan placed downstream of the spray dryer chamber.

15. A spray dryer apparatus according to claim 9, comprising a graphic display device for displaying to an operator at least a current value of an operational parameter.

* * * * *